US012303451B1

(12) United States Patent
Liu et al.

(10) Patent No.: US 12,303,451 B1

(45) Date of Patent: May 20, 2025

(54) STIMULATION DEVICE INCLUDING CANTILEVERED PENDANT

(71) Applicant: HYTTO PTE. LTD., Singapore (SG)

(72) Inventors: Dan Liu, Guangdong (CN); Jilin Qiu, Guangdong (CN)

(73) Assignee: HYTTO PTE. LTD, Singapore (SG)

( * ) Notice: Subject to any disclaimer, the term of this patent is extended or adjusted under 35 U.S.C. 154(b) by 0 days.

(21) Appl. No.: 18/748,281

(22) Filed: Jun. 20, 2024

(51) Int. Cl.

| | |
|---|---|
| ***A61H 19/00*** | (2006.01) |
| ***A61H 23/02*** | (2006.01) |
| ***A61H 23/04*** | (2006.01) |

(52) U.S. Cl.

CPC ......... *A61H 19/40* (2013.01); *A61H 23/0218* (2013.01); *A61H 23/0245* (2013.01); *A61H 23/0263* (2013.01); *A61H 23/04* (2013.01); *A61H 2023/0227* (2013.01); *A61H 2201/1215* (2013.01); *A61H 2201/123* (2013.01); *A61H 2201/1666* (2013.01); *A61H 2201/1671* (2013.01); *A61H 2201/1676* (2013.01)

(58) Field of Classification Search

CPC ........ A61H 19/00; A61H 19/30; A61H 19/32; A61H 19/34; A61H 19/40; A61H 19/44

See application file for complete search history.

(56) References Cited

U.S. PATENT DOCUMENTS

| | | | | |
|---|---|---|---|---|
| 7,438,681 B2 * | 10/2008 | Kobashikawa | A61H 19/32 | 600/38 |
| 8,419,611 B1 * | 4/2013 | Hatami | A61H 19/50 | 600/38 |
| 9,737,458 B1 * | 8/2017 | Olivares | A61H 21/00 | |
| 10,940,078 B1 * | 3/2021 | Lee | A61H 19/34 | |
| 11,471,371 B2 * | 10/2022 | Topolev | A61H 23/0263 | |
| 11,801,196 B1 * | 10/2023 | Liu | A61H 19/44 | |
| 12,011,409 B1 * | 6/2024 | Wang | A61H 19/40 | |
| 12,064,386 B1 * | 8/2024 | Yan | A61H 23/02 | |
| 12,156,843 B2 * | 12/2024 | Wang | A61H 7/00 | |
| 12,171,710 B1 * | 12/2024 | Huang | A61H 19/34 | |
| 12,178,775 B1 * | 12/2024 | Wang | A61H 19/44 | |
| 2008/0009775 A1 * | 1/2008 | Murison | A61H 19/44 | 600/38 |
| 2013/0345501 A1 * | 12/2013 | O'Reilly | A61H 19/44 | 600/38 |
| 2014/0309565 A1 * | 10/2014 | Allen | A61H 19/44 | 601/46 |
| 2016/0045392 A1 * | 2/2016 | Massey | A61H 19/00 | 601/46 |
| 2016/0120737 A1 * | 5/2016 | Sedic | A61H 19/44 | 601/46 |
| 2016/0331629 A1 * | 11/2016 | Pearson | A61H 19/44 | |
| 2018/0185237 A1 * | 7/2018 | Baetica | G08C 17/02 | |
| 2022/0257459 A1 * | 8/2022 | Dickinson | A61H 23/0263 | |

(Continued)

*Primary Examiner* — Timothy A Stanis

*Assistant Examiner* — Christopher E Miller

(74) *Attorney, Agent, or Firm* — F. CHAU & ASSOCIATES, LLC

(57) ABSTRACT

A sexual stimulation device, including a housing configured to be inserted into an orifice of a human body, the housing extending primarily in a first direction. A driving motor is at least partially disposed within the housing. A pendant is coupled to the housing and is driven by the driving motor to provide a force in a second direction, crossing the first direction, the pendant configured to apply the provided force to an interior surface of the human orifice.

14 Claims, 7 Drawing Sheets

(56) References Cited

U.S. PATENT DOCUMENTS

| | | | | |
|---|---|---|---|---|
| 2023/0355463 | A1* | 11/2023 | Cirillo-Schmidt | A61H 23/0263 |
| 2024/0299238 | A1* | 9/2024 | Yan | A61H 19/44 |
| 2024/0299239 | A1* | 9/2024 | Yan | A61H 23/0254 |

* cited by examiner

STIMULATION DEVICE INCLUDING CANTILEVERED PENDANT

TECHNICAL FIELD

The present disclosure relates to a sexual stimulation device and, more specifically, to a sexual stimulation device including a cantilevered pendant.

DISCUSSION OF THE RELATED ART

Sexual stimulation devices are devices that are designed to stimulate erogenous zones of a user so as to provide sexual stimulation. Often, these devices may be configured for insertion into a bodily orifice where stimulation may be more effectively provided.

Sexual stimulation devices may have multiple different components that may move to provide sexual stimulation, but sexual stimulation devices may have a tendency to inadvertently slide out of proper position while in use.

SUMMARY

A sexual stimulation device, including a main body including a housing, the main body configured to be inserted into an orifice of a human body, the housing extending primarily in a first direction. A driving motor is at least partially disposed within the housing. A pendant is coupled to the housing and is driven by the driving motor to provide a force in a second direction, crossing the first direction, the pendant configured to apply the provided force to an interior surface of the human orifice. The pendant extends primarily in a third direction that is substantially perpendicular to the second direction.

A sexual stimulation device includes a housing and a pendant hingedly connected to the housing. The pendant has a proximal end and a distal end, with respect to the housing, and the distal end of the pendant is connected to the housing via a flexible connector. The housing is configured to be inserted into an orifice of a human body together with the flexible connector and the pendant.

A sexual stimulation device includes a primary housing. A pendant is hingedly connected to the primary housing. The pendant includes a proximate end connected to the primary housing and a distal end that is configured to swing towards and away from the primary housing. A driving motor is configured to drive the distal end of the pendant to swing towards and away from the primary housing. An interface between the primary housing and the pendant is covered by a flexible connector.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
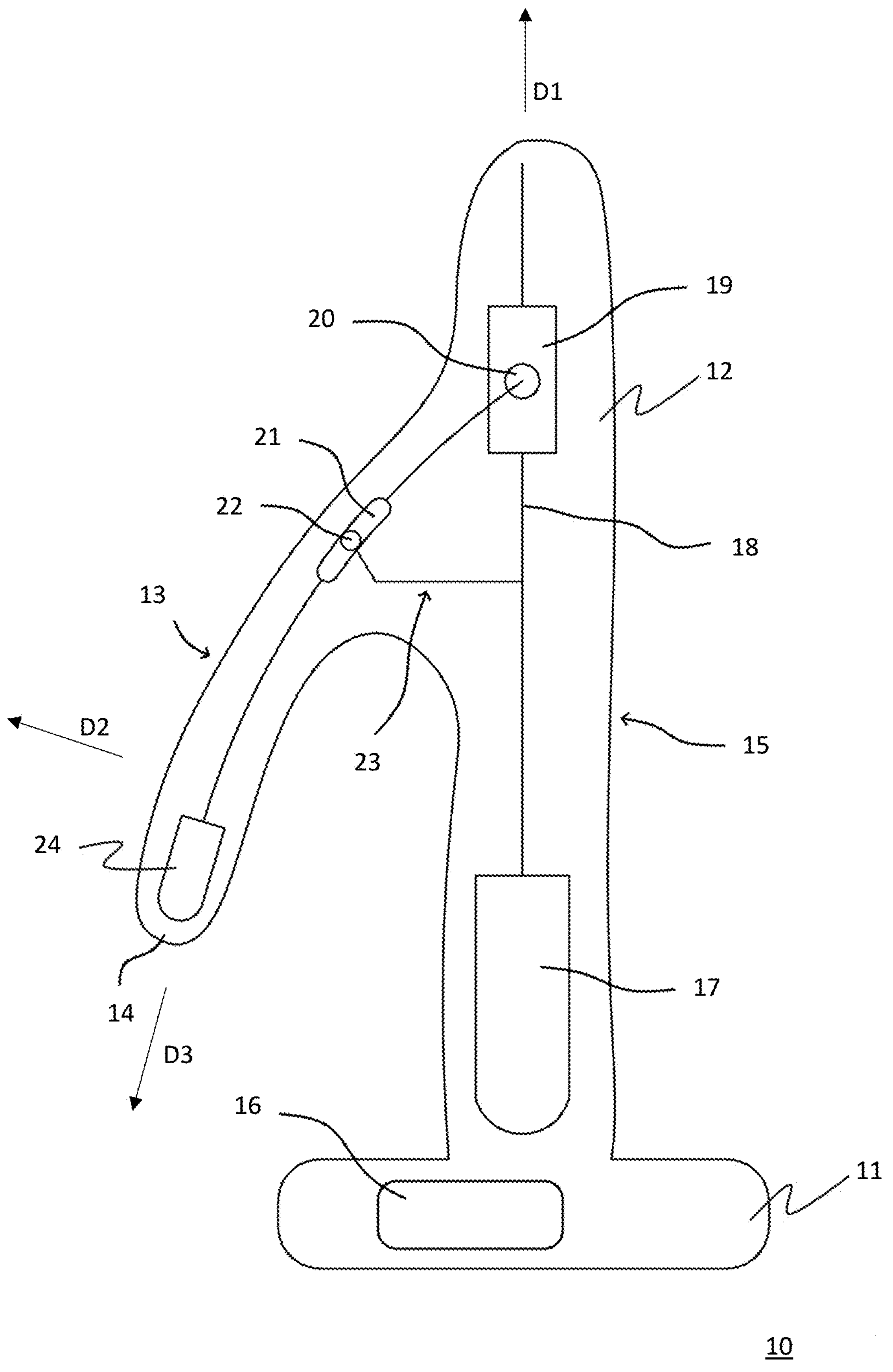
FIG. 1 is a schematic view of a sexual stimulation device according to exemplary embodiments of the present disclosure.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present disclosure may provide a sexual stimulation device that may be inserted into a desired orifice and then may more easily stay in place while delivering sexual stimulation to sensitive anatomical areas. This may be provided by the use of a cantilevered pendant appendage that extends from a main body of the stimulation device. The cantilevered pendant may be brought closer to the main body during insertion and removal (referred to herein as a state of retraction) and may be extended from the main body while in use to make accidental removal less likely (referred to herein as a state of extension). In its extended state, the cantilevered pendant may also more directly target stimulation to the sensitive anatomical areas, while engaging in a limited range of motion that both provides stimulation and keeps the stimulation device from accidental removal.

FIG. 1 is a schematic view of a sexual stimulation device according to exemplary embodiments of the present disclosure. As can be seen from this figure, the sexual stimulation device 10 includes a base 11 and a stimulation body 12 projecting therefrom primarily in a first direction D1, for example, projecting perpendicularly therefrom. The cantilevered pendant 13 extends from a proximal end 20 of the body 12 and is configured to swing away from the body 12 at a distal end 14 of the pendant 13 in a second direction D2. The cantilevered pendant 13 extends primarily in a third direction D3 that intersects with the first direction D1. The swinging of the cantilevered pendant 13 may be implemented by a hinge arrangement as is described in greater detail below.

The device 10 may be covered in a casing 15 that might be substantially waterproof, bendable, stretchable, and non-irritating. For example, the casing 15 may include an inner hard plastic layer and an outer skin layer that may include, for example, silicone or another synthetic or natural rubber or soft plastic. The outer skin layer may be removable so as to be more easily cleanable, or may be fixed to the inner hard plastic layer. The casing 15 may have controls disposed thereon and may include one or more ports or pins for connecting the device 10 for charging or digital communication or control. The casing 15 may also include one or more hatches or openings for accessing internal components such as a power source 16, such as a battery.

The power source 16 may be disposed within the casing 15, either within the base 11, as shown, or within the body 12 or pendant 13. The power source 11 may be used to drive a driving motor 17 and/or one or more vibration motors 24, under the control of a controller circuit that may be disposed within the casing 15. The power source 16 may be a rechargeable battery or may include a container for removable batteries.

The driving motor 17 may drive a drive shaft 18 so as to move a reciprocator 19 upwards and downwards in a reciprocating motion. As the reciprocator 19 moves up and down, it may push and pull on a connector that moves a slide 22 that is within a slot 21 or track. The degrees of freedom of the slide 22 may be limited by the slot 21 which may be connected to the body 12 by a cantilever beam 23. In this way, the pendant 13 is driven to move closer and farther from the body 12 under the action of the driving motor 17. For example, the pendant 13 is driven to move in the second direction D2, which may be substantially perpendicular to the third direction D3 (noting that as the pendant 13 moves, the third direction D3 is understood to change accordingly so as to always align with the primary direction of extension of the pendant 13 and so too does the second direction D2 change so as to remain perpendicular to the third direction D3).

The distal end 14 of the pendant 13 may include a vibration motor 24 disposed within the casing 15 thereof. This vibration motor 24, under the control of the controller, may receive power from the power source 16 and create vibration that may stimulate the erogenous zones of the user. The vibration motor 24 may be embodied as an electromagnetic shaker, a piezoelectric actuator, an eccentric mass vibrator, a pneumatic vibrator, a hydraulic vibrator, an ultrasonic transducer, a mechanical vibrator, an electric vibrator, a magnetostrictive transducer, a linear resonant actuator, etc.

Thus, the stimulation device 10 may be programmed to exhibit an insertion/removal mode in which the pendant 13 is brought close to the body 12. The programming of the mode of the stimulation device 10 may be stored within a storage element of the stimulation device, such as a flash memory or an eclectically erasable programmable read-only memory (EEPROM) and may be executed by a microprocessor, a system-on-chip, or any other sittable logic circuit disposed within the stimulation device 10. Use modes may be pre-programmed and may be user-programmable, for example, by connecting an external device such as a computer or smartphone running a specialized application. The connection to the external device may be handled by a radio module such as a Bluetooth module disposed within the stimulation device 10 or by a direct wired connection. A use mode may extend the pendant 13 to a desired spacing from the body 12, may activate the vibration motor 24, and may continue to drive the pendant 13 closer and farther from the body 12, within a more limited range of motion that keeps the pendant 13 far enough from the body 12 so that accidental removal is made less likely. In this way, the distal end 14 of the pendant 13 may sweep back and forth across the erogenous zones of the user while in use.

Figure 2:
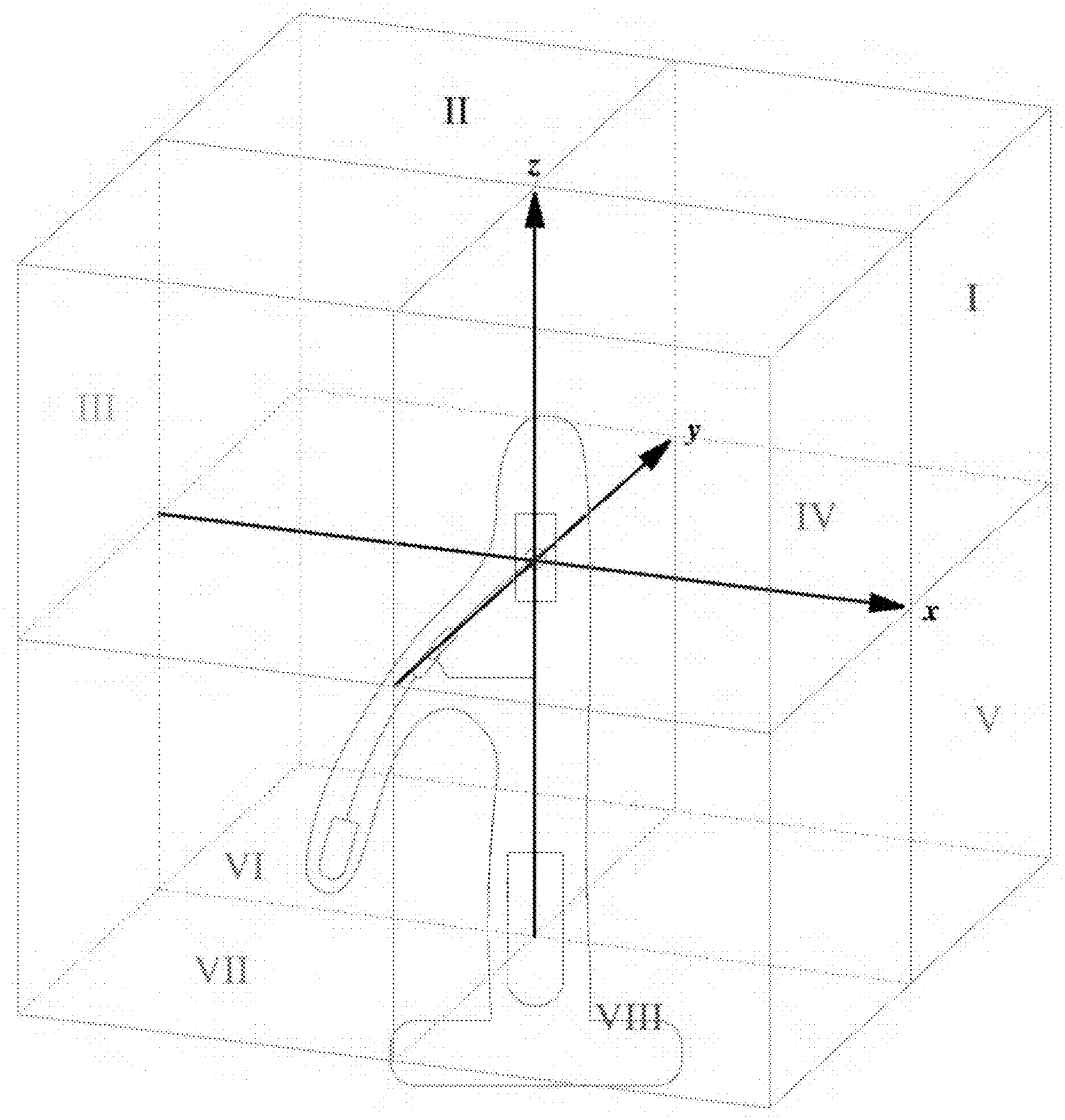
FIG. 2 is a diagram illustrating a range of motion of a pendant of a stimulation device in accordance with exemplary embodiments of the present disclosure.

FIG. 2 is a diagram illustrating a range of motion of a pendant of a stimulation device in accordance with exemplary embodiments of the present disclosure. As can be seen from this figure, the stimulation device exists within a three-dimensional Euclidian space that can be centered about the proximal end thereof, which may be thought of as being divided into eight octants. The first four octants I, II, III, and IV make up a top section of the space and the second four octants V, VI, VII, and VIII make up the bottom section of the space.

The distal end of the pendant may have a range of motion that may be limited to at least one of the aforementioned lower octants V, VI, VII, and VIII, depending upon its state of rotation. The first direction can point to one of octant I, octant II, octant III, or octant IV.

The state of rotation may also be driven by the driving motor 17, or another actuator, so as to allow the pendant 13 to swing clockwise or counterclockwise relative to the body 12. This swing of the pendant may constitute a rotation thereof about a central axis of the primary housing. The central axis of the primary housing is set perpendicular to the proximal end 20 and is oriented perpendicular to the entire pendant 13. The cantilever action of the pendant 13 may be combined with the swinging action so as to allow the distal end 14 of the pendant 13 to trace a circular or elliptical motion as the distal end 14 moves close and away from the body 12 while also swinging back and forth (i.e., clockwise and counterclockwise). These circular movements may be used, for example, in conjunction with the vibration of the vibration motor 24, to provide a targeted stimulation to the erogenous zones of the user while also maintaining a spacing from the body 12 sufficient to preclude accidental removal.

The circular or elliptical movements may be driven by a rotational stage that is disposed within the stimulation body or by a means that draws from the rotational motion of the motor, as will be described in greater detail below.

Figure 3:
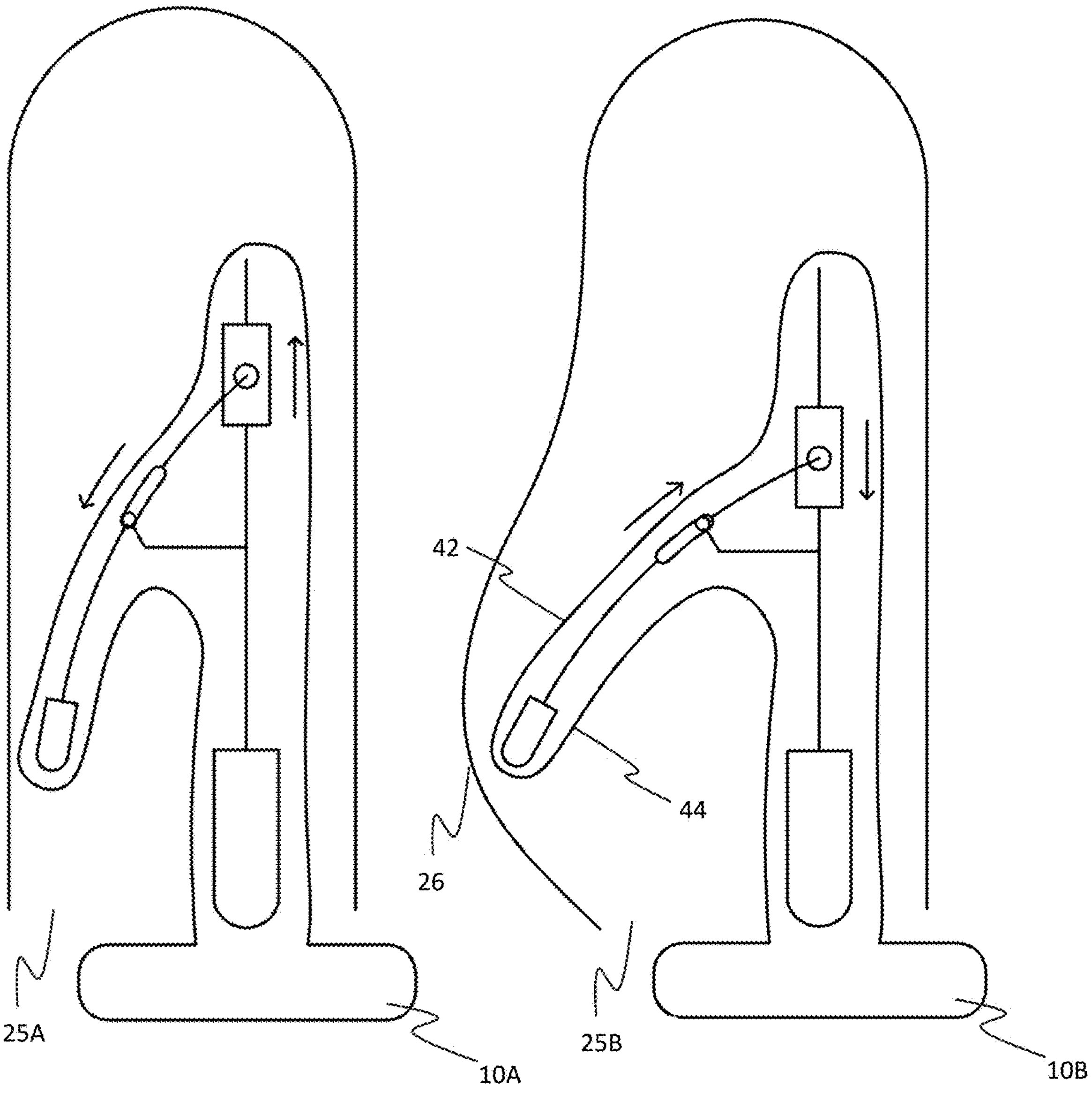
FIG. 3 is a schematic view of a stimulation device in a state of extension and in a state of retraction in accordance with exemplary embodiments of the present disclosure.

FIG. 3 is a schematic view of a stimulation device in a state of extension and in a state of retraction in accordance with exemplary embodiments of the present disclosure. The stimulation device 10 may be in a state of retraction, as shown by device 10A. In the state of retraction, the distal end of the pendant may be brought closer to the stimulation body so that the device 10A may be more easily inserted into an orifice 25A of the user. In the state of extension, the distal end of the pendant may be extended farther from the stimulation body so that the device 10B is kept from accidental removal and so an outer curved surface 42 of the distal end of the pendant may come into a position proximate to the erogenous zones of the user 26, while disposed within the orifice 25B. The distal end of the pendant may also have an inner curved surface 44 that is opposite to the outer curved surface 42 and faces the stimulation body 12.

The distal end may either remain in a fully extended state while in use or may be driven in a cycle of extension and retraction and/or may be made to quickly vibrate inwardly and outwardly by the repetition of small movements.

For context, the orifice that the stimulation is inserted into may be a human anus or vagina and the erogenous zone may be a g-spot (female) or a p-spot (male), which may be based on the location of the prostate gland. However, the orifice and erogenous zone are not necessarily limited thereto.

Figure 4:
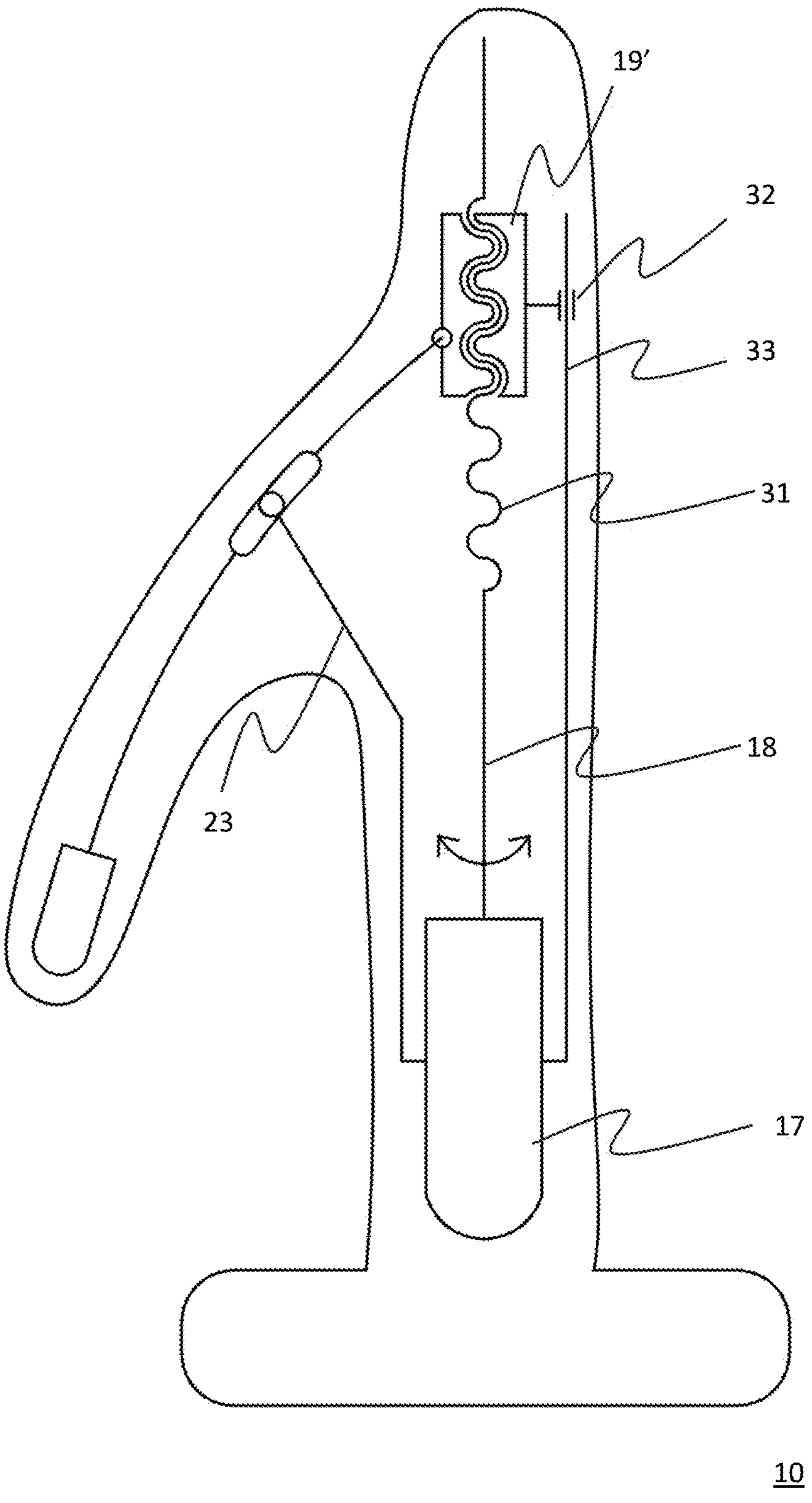
FIG. 4 is a schematic diagram illustrating one exemplary approach for implementing the mechanisms of the stimulation device, in accordance with exemplary embodiments of the present disclosure.

While there may be many means of configuring the internal mechanisms of the stimulation device to achieve the above-described motion, FIG. 4 is a schematic diagram illustrating one exemplary approach for implementing the mechanisms of the stimulation device, in accordance with exemplary embodiments of the present disclosure.

As can be seen in this figure, the stimulation device 10 may include a driving motor 17 that may rotate a drive shaft 18 in one of two direction. The drive shaft 18 may be fixedly attached to the motor 17 (which may be fixedly disposed within the casing 15) so that the drive shaft 18 rotates but is not free to move up and down. The drive shaft 18 may have a spiral section 31 that is threaded through threads of a reciprocator 19' so that as the drive shaft 18 rotates, the reciprocator 19' is either pulled downwardly (towards the base) or pushed upwardly (away from the base) by the twisting of the shaft 18. The reciprocator 19' may be free to move in the up and down directions (positive and negative first direction D1) and so, as the shaft 18 rotates and the spirals thereof twist through the threads of the reciprocator 19' pulling it down and pushing it up.

The reciprocator 19' may be kept from rotating by being attached to a guide 32 that a brace 33 passes through. The guide 32 may be embodied as a ring that the brace 33 passes within. The brace 33 stays stationary, being fixed to the internal elements of the casing, and the guide 32 is thereby limited to upward and downward motion, which is in turn imparted to the reciprocator 19'. In this way, the reciprocator 19' is allowed to move up and down smoothly without wobble.

The reciprocator 19' has a wire or other rigid structure connected thereto that is also attached to a slot 21 at one end thereof, as may be seen in FIG. 1. The other end of the slot 21 is fixedly attached, by a wire or other rigid structure, to the distal end 14 of the pendant 13. The slot 21 is restricted in motion by a slide 22 which is disposed therein. The slide 22 is configured to slide within the bounds of the slot and no further, or, more precisely, the slide is fixed in place and the slot 21 slides around the slide 22 with the ends of the slot dictating the permissible range of motion. The slide 22 is fixed to a cantilever beam 23 which is connected to a brace and so as the reciprocator 19' moves down, the slot 21 rotates and moves and the distal end 14 of the pendant 13 lifts up. Conversely, as the reciprocator 19' moves up, the slot rotates and moves the opposite way and the distal end 14 of the pendant moves down (i.e., closer to the stimulation body 12).

By reversing the direction of current trough the driving motor 17, the direction of motion may be changed. Alternatively, the drive shaft 18 might not have a spiral 31 section and may instead have a lateral protrusion that engages with the threads of the reciprocator and by fashioning the threads to be double-helical with connecting top and bottoms, the reciprocator may be configured to move up and down in a reciprocating fashion as the motor 17 rotates in only a single direction.

Figure 5:
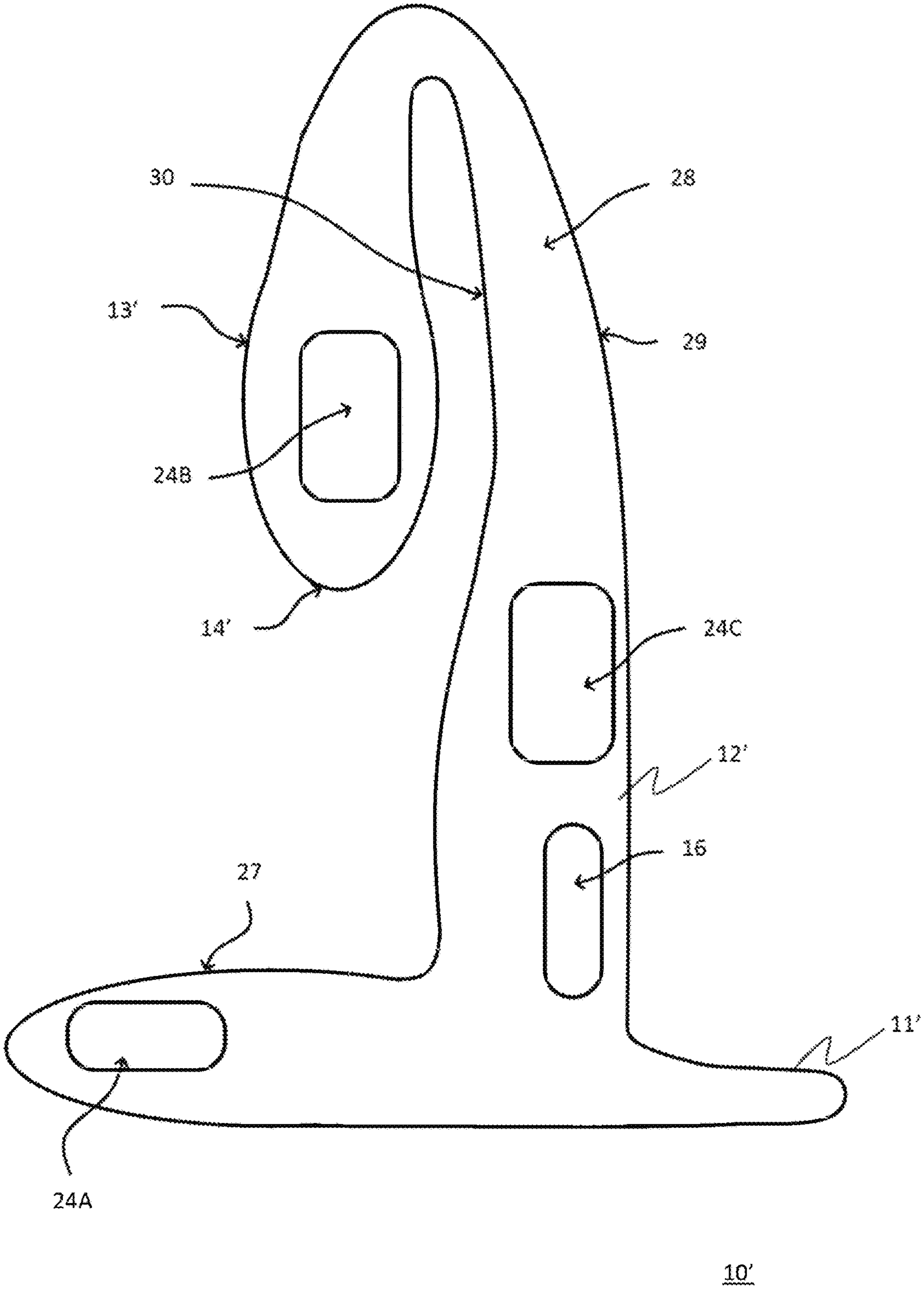
FIG. 5 is a cross-sectional view of a stimulation device with an effective and pleasing shape in accordance with exemplary embodiments of the present disclosure.

While FIGS. 1-4, discussed above, may show various internal mechanical components responsible for achieving the desired motion of the stimulation device, the shape of the stimulation device depicted therein may be made to have a more effective and pleasing shape. FIG. 5 is a cross-sectional view of a stimulation device with an effective and pleasing shape in accordance with exemplary embodiments of the present disclosure. It is to be understood, however, that the mechanisms and operation of the device shown in this figure does not necessarily deviate from what has been shown above and this figure is intended to show a more specific form for the device casing and other ergonomic aspects, without necessarily contradicting what has been described with respect to the other figures. Thus, to the extent that elements or features are not described with respect to FIG. 5, it may be assumed that those elements and features are at least similar to what has been described with respect to the remaining figures.

As may be appreciated from this figure, the stimulation device 10' may include a contoured base 11' and a contoured stimulation body 12' extending therefrom. Various controls and indicators may also be seen as attached to or disposed within the contoured base 11'. The contoured stimulation body 12' may include the power source 16.

The top portion of the contoured stimulation body 12' may be a flexible body 28. The flexible body 28 may be configured to be bent and may exhibit a restorative force after having been bent so as to return to its original shape. The reciprocator might be within the lower portion of the contoured stimulation body 12' rather than within the flexible body 28. However, alternatively, the reciprocator may be disposed within the flexible body 28.

The flexible body 28 may have a second outer curved surface 29 and a second inner curved surface 30 that is shorter in length than the second outer curved surface 29 thereby creating a bent swan neck shape. A contoured pendant 13' may extend from the flexible body 28. The contoured pendant 13' may be configured to extend away from, and be drawn in to, the flexible body 28 and/or the contoured stimulation body 12'.

A secondary stimulation body 27 may extend from the contoured base 11'.

Various vibration motors may be disposed within the contoured stimulation device 10'. For example, a first vibration motor 24A may be disposed within the secondary stimulation body 27, a second vibration motor 24B may be disposed within a distal end 14' of the contoured pendant 13', and a third vibration motor 24C may be disposed within the contoured stimulation body 12'. Each of these vibration motors may be powered by the power source 16.

Figure 6:
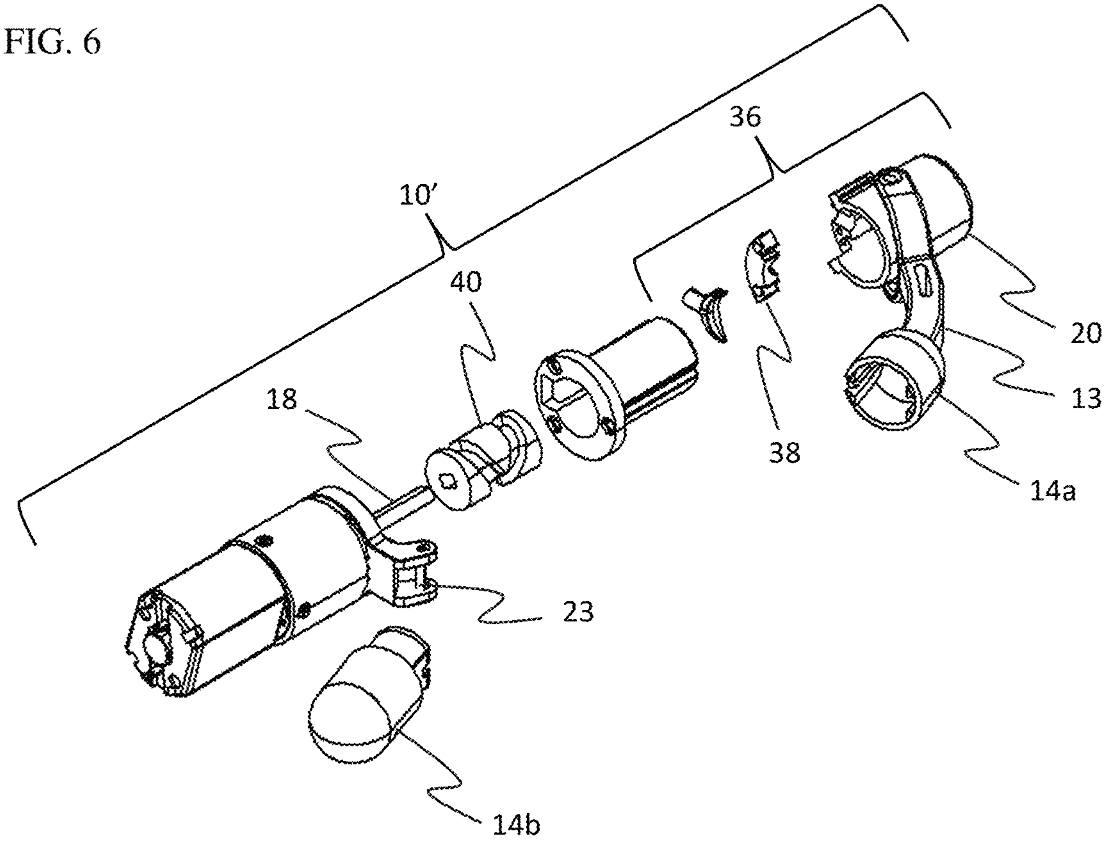
FIG. 6 is an exploded view of a mechanical apparatus for a sexual stimulation device in accordance with exemplary embodiments of the present invention.

FIG. 6 is an exploded view of a mechanical apparatus 10' for a sexual stimulation device in accordance with exemplary embodiments of the present invention. Here, the proximal end 20 of the stimulation body 12 is configured to move in a reciprocating fashion towards and away from the cantilever beam 23, which retains a fixed position. This action causes the pendant 13, and in particular, its distal end 14 (which is made up of a first portion 14*a* and a second portion 14*b* which may come together and lock in place) to raise and lower in the second direction D2. The pendant 13 may be seen as being hingedly connected to the proximal end 20, for example, on two opposite sides thereof.

The driving of the proximal end 20 may be implemented by spinning of the drive shaft 18 which spins a screw 40, for example, by the drive shaft 18 having a faceted shape that engages with a similarly shaped opening in the screw 40. The screw 40 is free to rotate by the rotation of the drive shaft 18 but is fixed to the drive shaft 18 so as not to be permitted to move closer to or farther away from the motor. A slider 38, which is fixed inside of the proximal end 20 of the stimulation body 12, engages with the thread of the screw 40 such that as the screw 40 rotates, the slider 38 is driven and it takes the proximal end 20 with it. The proximal end 20 is not directly fixed to the base of the device that houses the motor and so it is free to move farther away from the motor, within the housing. The threading of the screw 40 may be arranged in a double helix with attached ends so as to push the slider 38 along a path that ascends up and then descends down so as to create the reciprocating movement. In this way, the combination of the slider 38, the proximal end 20, and the associated hardware acts as a nut 36 that is driven in a reciprocating manner by the turning of the screw 40.

Figure 7:
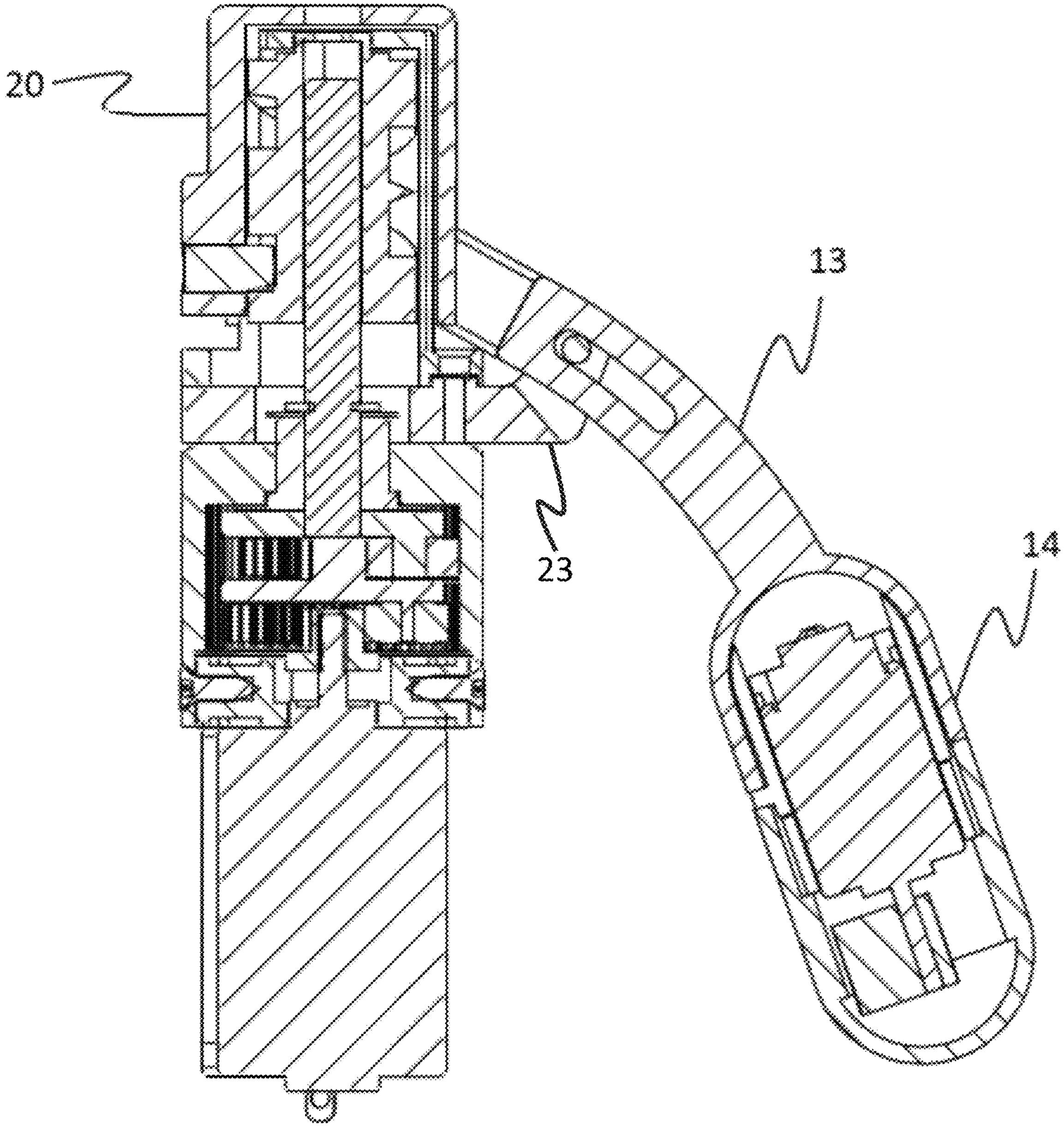
FIG. 7 is a schematic diagram of a mechanical apparatus for a sexual stimulation device in accordance with exemplary embodiments of the present invention.

FIG. 7 is a schematic cutaway diagram of a mechanical apparatus for a sexual stimulation device in accordance with exemplary embodiments of the present invention. The mechanical apparatus may be disposed within the casing and in this configuration, the proximal end 20 of the stimulation body 12 may be configured to move up and down (in the first direction D1) in a reciprocating fashion, towards and away from the cantilever beam 23, which retains a fixed position. This action causes the pendant 13, and in particular, its distal end 14, to raise and lower (in the second direction D1).

As can be seen from this figure, the vibrating motor 24 is disposed within the pendant 14. Also, the stimulation body (proximal end) 20 is not directly affixed to the motor element, with the connection thereto being made virtue of the cantilever beam 23 which is connected to the slide 22 that is bound within the slot 21 of the pendant 13.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A sexual stimulation device, comprises:

a main body including a housing, the main body configured to be inserted into an orifice of a human body in a proximal-side-first manner, the housing extending primarily in a first direction;

a driving motor at least partially disposed within the housing, and a pendant coupled to the housing extending outwardly from the proximal side of the main body, and spaced apart from the housing at a distal side of the main body, and driven by the driving motor to provide a force in a second direction, crossing the first direction, the pendant configured to apply the provided force to an interior surface of the human orifice while the main body is inserted, wherein the pendant extends primarily in a third direction that is substantially perpendicular to the second direction.

2. The sexual stimulation device of claim 1, wherein the pendant has a distal end and a proximal end, with respect to the housing, and wherein the distal end of the pendant is configured to move within a single octant of a three-dimensional Cartesian coordinate system centered about the proximal end of the pendant, the single octant being one of octant V, octant VI, octant VII, or octant VIII.

3. The sexual stimulation device of claim 2, wherein the distal end of the pendant is configured to swing about an axis connecting the distal end of the pendant to the proximal end of the pendant, as driven by the driving motor, and wherein the interior surface of the human orifice is an erogenous zone.

4. The sexual stimulation device of claim 3, wherein the distal end of the pendant is configured to swing within the at least one single octant and is constrained so as not to extend beyond the at least one single octant.

5. The sexual stimulation device of claim 1, wherein the pendant comprises:

a proximal end, with respect to the housing, that is coupled to the housing;

a distal end, with respect to the housing, that is configured to rotate or otherwise move relative to the proximal end of the pendant, as driven by the driving motor, wherein the interior surface of the human orifice is an erogenous zone.

6. The sexual stimulation device of claim 5, further comprising:

a linear reciprocator including a slider, connected to and driven by the driving motor, wherein the slider is hinged to the proximal end of the pendant and is configured to exhibit linear reciprocating motion;

a power source configured to supply electrical power to the driving motor;

a sliding slot disposed between the proximal and distal ends of the pendant, with a direction of extension of the sliding slot corresponding to a direction of extension of the pendant; and a cantilever beam, disposed with a fixed end and a free end thereof, the fixed end disposed between the proximal and distal ends of the pendant, and the free end having a slide coupled to the sliding slot, wherein the slide is configured to slide back and forth along the sliding slot as the slider performs linear reciprocating motion, causing the distal end of the pendant to rotate relative to the proximal end of the pendant.

7. The sexual stimulation device of claim 1, wherein a vibration motor is disposed within the pendant.

8. The sexual stimulation device of claim 1, wherein the pendant includes an inner curved surface and an outer curved surface opposite to the inner curved surface, and wherein the outer curved surface is configured to stimulate an erogenous area of the interior surface of the human orifice as the outer curved surface swing towards and away from the housing.

9. A sexual stimulation device, comprising:

a primary housing configured to be inserted into an orifice of a human body in a proximal-side-first manner;

a pendant hingedly connected to the primary housing and extending outwardly at the proximal side of the primary housing, and spaced apart from the primary housing at a distal side of the primary housing, the pendant including a proximal end connected to the primary housing and a distal end that is configured to swing towards and away from the primary housing; and a driving motor configured to drive the distal end of the pendant to swing towards and away from the primary housing to apply a force to an interior surface of the orifice while the primary housing is inserted, wherein an interface between the primary housing and the pendant is covered by a flexible connector.

10. The sexual stimulation device of claim 9, wherein the pendant is configured to rotate about a central axis of the primary housing as the distal end thereof is driven to swing towards and away from the primary housing such that the distal end of the pendant traces a circular or elliptical path.

11. The sexual stimulation device of claim 9, further comprising:

a drive shaft configured to rotate by the driving motor, the drive shaft including a spiral section that rotates within a reciprocator so as to drive the reciprocator up and down as the drive shaft rotates;

a slot coupled to the reciprocator so as to be pulled up and down in conjunction with the reciprocator;

a slide disposed within the slot, the slide coupled to the primary housing by a cantilevered beam such that the slide remains stationary with respect to the primary housing and the motion of the slot is accordingly constrained to rotate about the slide in response to the motion of the reciprocator such that the distal end of the pendant swings towards and away from the primary housing under the action of the driving motor.

12. The sexual stimulation device of claim 9, further comprising a vibrating motor disposed within the distal end of the pendant.

13. The sexual stimulation device of claim 9, further comprising a base connected to the primary housing, the base including a vibrating motor disposed therein.

14. The sexual stimulation device of claim 9, wherein the pendant is configured to rotate about a central axis of the primary housing as the distal end thereof is driven to swing towards and away from the primary housing such that the distal end of the pendant traces a circular or elliptical path, and wherein the distal end of the pendant is constrained to fall exclusively within a single octant of a three-dimensional Cartesian coordinate system centered about the proximal end, the single octant being one of octant V, octant VI, octant VII, or octant VIII.

* * * * *